United States Patent Office 3,103,622
Patented Sept. 10, 1963

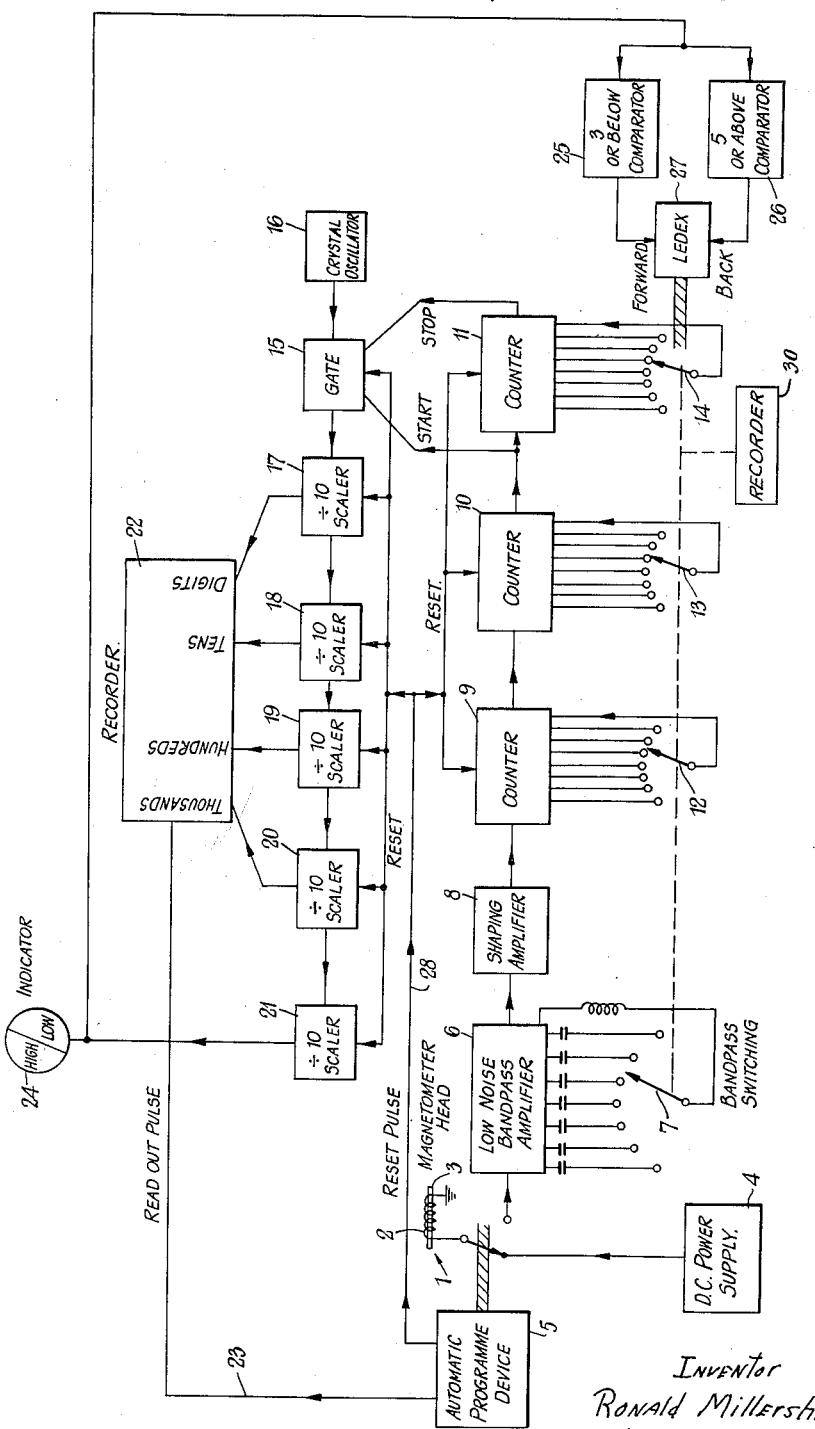

3,103,622
MAGNETOMETERS
Ronald Millership, New Barnet, England, assignor to Elliott Brothers (London) Limited, London, England, a company of Great Britain
Filed Mar. 11, 1960, Ser. No. 14,298
Claims priority, application Great Britain Mar. 16, 1959
10 Claims. (Cl. 324—.5)

This invention relates to magnetometers for measuring the intensity of an ambient magnetic field, for example, the earth's magnetic field.

It is known that the nucleus of the hydrogen atom, the proton, has a given mass, electric charge and angular momentum so that it tends to align itself with the direction of an ambient magnetic field due to the precession of the spinning nucleus about the direction of the field, the spin axis making a constant angle with the latter. The angular rate of precession is given by $W_p = \gamma_p H$, where $\gamma_p$ is the gyro-magnetic ratio, a known constant, and H is the intensity of the ambient magnetic field. It is also known that such proton precessions can be detected by first applying a strong polarising magnetic field to a medium, e.g. a liquid, containing an abundance of hydrogen atoms in order to reorientate the nuclei away from the direction of the ambient field and then removing the polarising field so that the consequent precession of the protons towards eventual re-alignment with the ambient field will induce a damped sinusoidal voltage in a coil arranged to surround the medium. By accurate measurement of the periodic time of this oscillation, which is of extremely low amplitude, a precise value of $$\frac{1}{H}$$

is found from which H can be simply calculated.

The apparatus employed comprises a magnetometer head (referred to hereinafter as "a magnetometer head of the type specified") having a container filled with a medium, preferably a liquid, containing an abundance of hydrogen atoms, means for applying the polarising magnetic field to the medium and means for detecting the proton precession signal.

As heretofore proposed, the measuring equipment employed with such magnetometer heads has been arranged to measure to a high degree of accuracy the periods of time occupied by always the same given number of cycles of the sinusoidal voltage appearing in the proton precession signal detecting means, with the result that the periods of time measured varied in length inversely with the intensity of the ambient magnetic field. This variation introduces inconveniences when the magnetometer is required, as is almost exclusively always the case, for use in the geophysical exploration of regions of the earth's surface from an aircraft, since either the rate at which measurements may be repeatedly made must allow for the longest time period likely to be encountered or the successive measurements cannot properly be synchronised with the operations of other equipment, such as photographic cameras for recording the terrain over which the aircraft is flying.

The object of the present invention is to provide an improved proton precession magnetometer in which these inconveniences shall be avoided with the consequent possibility of simplifying and reducing the weight of the equipment required.

According to the invention, in a proton precession magnetometer embodying a magnetometer head of the type specified, measuring equipment adapted to be connected to the proton precession signal detecting means is arranged to measure to a high degree of accuracy the periods of time occupied by selected numbers of cycles of the sinusoidal voltage appearing in the proton precession signal detecting means, the numbers of cycles being so selected in relation to the intensity of the ambient magnetic field that the periods of time to be measured will always approach a substantially constant value.

According to a preferred embodiment of the invention a proton precession magnetometer comprises a magnetometer head of the type specified, a plurality of serially connected cycle counters for counting the cycles detected by the detecting means, a gate supplied with timing pulses from an oscillator and arranged to be opened by the cycle counters after counting a first predetermined number of cycles and to be closed by the cycle counters after counting a second predetermined number of cycles, switch means adjustable to control the cycle counters to vary the first and second predetermined number of cycles, a plurality of serially connected pulse counters for counting the timing pulses passed by the gate and means responsive to the count of the final pulse counter in the series automatically to adjust the switch means in the sense to oppose any variation in the count of the final pulse counter from a predetermined value.

More particularly stated, the proton precession magnetometer according to this invention comprises a magnetometer head of the type specified having a coil wound around the container to serve both as the means for applying the polarising magnetic field to the medium and as the means for detecting the proton precession signal, means capable of supplying a large unidirectional electric current, measuring equipment and means for periodically connecting the coil of the magnetometer head alternately to the current-supplying means and to the measuring equipment and is characterised in that the measuring equipment comprises cycle-counting means capable of counting the cycles of the sinusoidal voltage appearing in the coil, means for generating electrical pulses at a precisely predetermined frequency, means capable of counting such pulses, a connection from the pulse-generating means to the pulse-counting means including a gate, means adapted to open the gate upon the occurrence of a given counting operation of the cycle-counting means, means adapted to close the gate upon the occurrence of a subsequent given counting operation of the cycle-counting means, range-varying means capable of operation to preset the cycle-counting means so that any one of a series of different given numbers will be counted thereby between said given counting operations, and means for indicating the count made by the pulse-counting means during the period that the gate is open, said range-varying means being adapted to be operated so that the count made by the pulse-counting means may always represent approximately the same length of time whatever the frequency of the sinusoidal voltage and the setting of the range-varying means being employed in conjunction with the indication of the count made by the pulse-counting means in determining the intensity of the magnetic field being measured.

One example of a magnetometer according to this invention will now be described, reference being made to the accompanying circuit diagram.

In this example, the magnetometer head indicated generally at 1 comprises a coil 2 wound around a container 3 containing a liquid medium having an abundance of hydrogen atoms. The coil 2 serves both as the means for applying the polarising magnetic field to the medium and as the means for detecting the proton precession signal. The coil 2 is arranged to be switched alternately to a D.C. power supply 4 and to a measuring equipment under the control of a motor-driven programme device 5. The measuring equipment comprises a low-noise band-pass amplifier 6 arranged so that the centre frequency of the band of frequencies passed by the amplifier 6 may be changed in a series of steps by means of a range-varying switch 7, each successive frequency pass band being arranged to overlap the preceding one to a significant extent. The output from the band-pass amplifier 6 is fed to a shaping amplifier 8 in which the amplified signal from the coil 2 of the magnetometer head 1 is converted into pulses of an appropriate shape for operating a cycle-counting unit, there being one such pulse for each cycle of the sinusoidal voltage which appears in the coil 2 while this is connected to the measuring equipment.

The cycle-counting unit comprises three counters, 9, 10 and 11 connected in series. The first counter 9 produces an output for each *a* input pulses, the second counter 10 produces an output for each *b* input pulses thereto and the third counter 11 produces an output for each *c* input pulses thereto. Thus the second counter 10 will produce an output for each *a b* pulses from the amplifier 8 and the third counter 11 will produce an output after *a b c* pulses from the amplifier 8. The time between the first input to the counter 11 and its output corresponds therefor to the time occupied by *a b c* pulses less *a b* pulses from the amplifier 8.

The values of *a*, *b*, and *c* counted by the counters 9, 10 and 11 are controlled respectively by switches 12, 13 and 14 linked together and linked with the switch 7 so that all are movable together over a range of seven contacts. The values of *a* counted by the counter 9 in the seven switch positions starting from the left-hand position are 10, 10, 10, 15, 15, 10 and 10 respectively. The values of *b* counted by the counter 10 in the seven switch positions starting from the left-hand position are 4, 4, 4, 4, 4, 10 and 10 respectively. The values of *c* counted by the counter 11 in the seven switch positions starting from the left-hand position are 7, 8, 9, 7, 8, 6 and 7 respectively. Thus the values of *a b* in the seven positions are 40, 40, 40, 60, 60, 100 and 100 respectively, the values of *a b c* are 280, 320, 360, 420, 480, 600 and 700 respectively and the values of *a b c* less *a b* are 240, 280, 320, 360, 420, 500 and 600 respectively.

The output from the counter 10 is arranged to open a gate 15 supplied with pulses from a crystal-controlled timing oscillator 16, the gate 15 being closed by the output from the counter 11 which occurs at *a b c* less *a b* pulses after the output from the counter 10. This number of pulses is selected by controlling the switches 12, 13 and 14 so that the period of time occupied thereby, and hence the period of time during which the gate 15 passes the timing pulses is always substantially constant within certain narrow limits, the switch 7 being controlled with the switches 12, 13 and 14 to select the optimum centre frequency for the band-pass amplifier 6.

A pulse counting unit comprising five scale-of-ten counters 17, 18, 19, 20 and 21 connected in series is connected to the output of the gate 15, these counters 17 to 21 being arranged to return to "zero count" when reset after a counting operation. Each counter 17 to 21 is of the type which produces an output voltage strictly proportional to its digit indication over the range from 0 to 9. The output terminals of the counters 17 to 20 are connected through amplifiers (not shown) to the four channels of a multi-channel recording voltmeter 22, each recording pen of which operates over a respective part of the width of a paper strip of the recorder which is driven continuously at a given rate in synchronism with the programme device 5, preferably by the same motor. The parts of the width of the strip are each calibrated from 0 to 9 so that an easily readable digital record of the count will be produced. The connection of the output terminals of the counters 17 to 20 to the recorder 22 is effected periodically each time that a "read-out" pulse is transmitted from the programme device 5 along the line 23. The output terminals of the counters 17 to 20 may also be connected, if desired, to indicating voltmeters with their scales calibrated from 0 to 9 to provide a visual indication of the count.

The output terminal of the final or tens of thousands counter 21 may also be connected to the recorder 22 but in practice this is not necessary as the count will always lie between 40,000 and 50,000 so that the output from the counter 21 must correspond to 4 and is known. It is, however, permanently connected to an indicating voltmeter 24 which has its scale marked substantially centrally of its length to indicate an acceptable range, which in this example is 40,000 to 50,000. The "high-reading" end of the scale is marked "High" and the other end of the scale is marked "Low," so that an observer can determine immediately from the position of the pointer of the voltmeter 24 whether a change in the setting of the switches 7, 12, 13 and 14 is required to produce optimum results. For example, if the indication is "High" the range-varying switch 7 must be moved to set the band-pass filter to pass a band of frequencies having a lower centre frequency with the consequent setting of the switches 12, 13 and 14 to count a smaller number of cycles. The setting of the switches 7, 12, 13 and 14 is desirably controlled automatically. This is achieved by connecting the output terminal of the counter 21 in parallel to two comparators 25 and 26 the outputs of which control the setting of the switches 7, 12, 13 and 14 by means of a suitable device 27. The comparators 25 and 26 have a time response such that they do not respond to the count of the counter 21 whilst a count is being carried out. The comparator 25 produces an output if the final count of the counter 21 is three or less and operates the device 27 to set the switches 7, 12, 13 and 14 to increase the count. The comparator 26 produces an output if the final count of the counter 21 is five or more and operates the device 27 to set the switches 7, 12, 13 and 14 to reduce the count. Thus the comparators 25 and 26 operate to maintain the output of the counter 21 at four and the setting of the switches 7, 12, 13 and 14 is never at other than the optimum setting for more than one measuring period. Furthermore the significant overlap of successive frequency pass-bands prevents hunting. The device 27 is conveniently a "Ledex" switch which is an electro-magnetically operated rotary switch.

The programme device 5 periodically supplies a reset pulse along line 28 to the counters 9, 10 and 11 and 17 to 21 to reset them to zero count and also to the gate 15 to reset the latter. It will be appreciated that *a b* pulses are counted by the counters 9 and 10 before the gate 15 is opened. In the first or left-hand position of the switches 12 and 13 this is forty pulses and it will be appreciated that this initial value of *a b* may be modified by arranging for the reset pulse to the counter 10 to set it to a count intermediate 0 and the value for which it is set by the switch 13. Thus it may be reset by the reset pulse to a count of 2 so that it will produce its first output after counting 20 cycles and thereafter produces an output at every 40 cycles. This initial count before opening the gate 15 allows time for the transient effects due to the de-energising of the coil 2 to die away.

The programme device 5 is arranged periodically to effect the following sequence of operations, namely, (1) The disconnection of the coil 2 of the magnetometer head 1 from the band-pass amplifier 6 with its immediate re-connection to the D.C. source 4 and the simultaneous transmission along the line 23 of a "read-out" pulse;

(2) While the coil 2 is still energised but after the read-out pulse has terminated, the transmission of a reset pulse along the line 28 to all the counters 9 to 11 and 17 to 21 and to the gate 15;

(3) The termination of the reset pulse and the disconnection of the coil 2 from the D.C. source 4 with its immediate re-connection to the band-pass amplifier 6. This sequence is repeated at short intervals of time, in the example chosen for illustrating the invention at half-second intervals, the duration of the energisation of the coil 2 being sufficient to align the protons in the liquid in the magnetometer head 1 with the applied magnetic field (say 200 milli-seconds) and the duration of the period for which the coil 2 is connected to the band-pass amplifier 6 being amply sufficient to enable the counters 9 to 11 to count the predetermined number of cycles (say 280 milli-seconds).

In the operation of the magnetometer 1, the switches 7, 12, 13 and 14 are set to correspond to the expected intensity of the ambient magnetic field and the programme device 5 is started into operation. The coil 2 of the magnetometer head 1 is energised from the D.C. source 4 while any count registered in the counters 17 to 21 is read out and recorded and these counters reset. The coil 2 is then switched from the D.C. source 4 to the band-pass amplifier 6 and pulses each corresponding to one cycle of the sinusoidal voltage appearing in the coil are fed to the counter 9. Only when $a\,b$ pulses have been fed in is there an output from the counter 10, this allowing time for transient effects due to the de-energising of the coil 2 to die away (as has been explained), and this output is utilised to open the gate 15. The cycle-representing pulses continue to pass into the counter 9 and when the total number thereof reaches the value for which the counters 9, 10 and 11 have been set by the positioning of the switches 12, 13 and 14 an output is delivered by the counter 11 to close the gate 15.

During the period of time for which the gate 15 is open, the pulses from the timing oscillator 16 are passed into the counter 17 and are counted. The indicating voltmeter 24 permanently connected across the terminals of the final counter 21 shows an indication which progressively increases in magnitude as the count proceeds. If this indication reaches but does not pass beyond the central zone of the scale of the voltmeter, the setting of the range-varying switches 7, 12, 13 and 14 are apt for the field-intensity being measured. Should the indication rise beyond or fall short of this zone, i.e. should the count indicated be 3 or less or 5 or more, the device 27 is operated to change the setting of the switches accordingly. If the setting is correct, the count made by the counters 17 to 21 will always be of about the same magnitude, irrespective of the field-intensity, although there will be variations in the count due to changes in this intensity.

After the gate has closed a read-out pulse is transmitted from the programme device 5 along the line 23 and this pulse is also utilised to change-over the coil 2 from connection to the band-pass amplifier 6 to connection to the D.C. source 4. The count registered in the counters 17 to 20 is then recorded in the recorder 22 and a reset pulse is transmitted along the line 28 from the programme device 5 to cause the counters 9 to 11 and 17 to 21 to return to their appropriate initial counts, i.e. zero count in each case.

In the example chosen for illustrative purposes it is assumed that the range of field intensities to be investigated is from 25,000 gamma to 75,000 gamma. The number of cycles counted between the opening and closing of the gate 15 is 240 for a field intensity of from 24,000 to 30,000 gamma, the corresponding frequency range of the sinusoidal voltage in the coil 2 of the magnetometer head 1 being from 1021.84 to 1277.31 cycles per second. For the other steps in the field-intensity range the figures are:

| No. of cycles counted | Field × $10^3$ gamma | Frequency |
|---|---|---|
| 280 | 28–35 | 1192.16–1490.2 |
| 320 | 32–40 | 1362.45–1703.08 |
| 360 | 36–45 | 1532.77–1915.96 |
| 420 | 42–52.5 | 1788.23–2235.29 |
| 500 | 50–62.5 | 2128.85–2661.06 |
| 600 | 60–75 | 2554.62–3193.28 |

The frequency of the pulses delivered by the timing oscillator 16 is arranged to be approximately 200 kc./s., it being chosen in practice to be a precise frequency slightly higher than this in order to give an integral ratio between the final count of the counters 17 to 21 and the intensity of the field being measured. It will be seen that this final count always lies between 40,000 and 50,000 if the switches are correctly set in relation to the intensity of the field. These counts, therefore, always take between about 0.2 second and about 0.25 second to register. Consequently, a measurement may be made every half-second and the timing of these measurements may be synchronised with the operations of a camera producing a photographic record of the terrain over which the magnetometer is being borne by an aircraft.

It will be understood that correct interpretation of the record of the counts made necessitates knowledge of the setting of the switches 7, 12, 13 and 14 which applied during the making of each count. Since the rate of change of the intensity of the earth's magnetic field is relatively small, even in the region of an anomaly, it is not often necessary for the setting of the switches to be changed and it is an easy matter to record the setting, e.g. by means of a suitable recorder 30. The setting of the switches is desirably recorded automatically, alongside the recorded counts.

The final counts may also be registered digitally in a punched card or punched tape recorder by providing a suitable drive unit.

It is preferred, and particularly when the magnetometer is to be carried in an aircraft, to construct the amplifiers and counters with transistors so that the weight and size of the equipment may be reduced to the minimum. Where a photographic record of the terrain over which the aircraft is flying is being produced, this record is produced in synchronism with the drive to the programme device 5 and the recorder 22 so that the record from the latter will have the same dimensions as the photographic record and may be laid alongside the latter and the field strength record may be transferred to the photographic record with a minimum effort.

What I claim is:

1. A proton precession magnetometer comprising means for detecting the precession cycles of protons in a medium, cycle counting means for counting the cycles detected by the detecting means, a timing pulse generator, pulse counting means, a gate controlled by said cycle counting means to pass timing pulses from said generator to said pulse counting means during the period of time occupied by said cycle counting means in counting a selected number of cycles, switch means operable to control the cycle counting means to vary said selected number of cycles and means responsive to the count of the pulse counting means to operate said switch means in the sense to maintain the count of the pulse counting means within predetermined limits.

2. A proton precession magnetometer according to claim 1 wherein said pulse counting means comprises a plurality of serially connected pulse counters and said means responsive to the count of the pulse counting means is arranged to respond to the count of the last pulse counter in the series to operate said switch means in the sense to oppose any departure of the count of said last pulse counter from a predetermined value.

3. A proton precession magnetometer according to claim 1 wherein said cycle counting means comprises a plurality of serially connected cycle counters, one of the cycle counters preceding the last cycle counter is arranged to generate a signal to open said gate after an initial number of cycles have been counted by the cycle counting means to pass pulses from the generator to the pulse counting means and said last cycle counter is arranged to close said gate after said cycle counting means has further counted said selected number of cycles.

4. A proton precession magnetometer comprising a magnetometer head including a container, a proton source within the container and means for applying a polarising field to the source and for detecting precession cycles of the protons, a plurality of serially connected cycle counters for counting the cycles detected by the detecting means, an oscillator for generating timing pulses, a gate supplied with said timing pulses and arranged to be opened by the cycle counters after counting a first predetermined number of cycles and to be closed after counting a second predetermined number of cycles, switch means adjustable to control the cycle counters to vary the first and second predetermined number of cycles, a plurality of serially connected pulse counters for counting the timing pulses passed by the gate and means responsive to the count of the final pulse counter in the series automatically to adjust the switch means in the sense to oppose any variation in the count of the final pulse counter from a predetermined value.

5. A proton precession magnetometer according to claim 4 wherein said switch means comprises an electromagnetically operated rotary switch and two comparators are provided responsive to the count of the final pulse counter and arranged one to advance the switch stepwise in one direction to increase the difference between said first and second predetermined numbers of cycles when the count of the final pulse counter falls below said predetermined value and the other to advance the switch stepwise in a direction opposite to said one direction to reduce the difference between said first and second predetermined numbers of cycles when the count of the final pulse counter exceeds said predetermined value.

6. A magnetometer according to claim 4 including a low-noise band-pass amplifier connected to the output of said detecting means and in which the centre frequency of the band of frequencies capable of being passed by the amplifier is adjustable in steps, each successive frequency pass band being arranged to overlap the preceding one to a significant extent, the amplifier being controlled by said switch means to select the frequency band appropriate to the frequency of the cycles detected.

7. A proton precession magnetometer according to claim 4 wherein means is provided to record the setting of the switch means to provide an indication of said first and second predetermined numbers of cycles.

8. A proton precession magnetometer according to claim 4 including a device arranged sequentially to connect a D.C. source to said polarising field applying means and simultaneously to apply a read-out pulse to said pulse counters, at the termination of the read-out pulse to apply a reset pulse to said cycle counters and said pulse counters, and, after the termination of the reset pulse, to connect said detecting means to said cycle counters.

9. A proton precession magnetometer according to claim 8 including means responsive to the read-out pulse to record the count of said pulse counters.

10. A proton precession magnetometer for measuring the intensity of a magnetic field comprising a container, a proton source within the container, a coil wound around the container to serve both as means for applying a polarising magnetic field to the source and as means for detecting precession cycles of the protons, a polarising unidirectional current source, cycle counting means capable of counting the cycles detected by the coil, means for periodically connecting the coil alternately to said current source and to said cycle counting means, means for generating electrical pulses at a predetermined frequency, means capable of counting such pulses, a gate connected between the pulse generating means and the pulse counting means, means adapted to open the gate upon the occurrence of a given counting operation of the cycle counting means, means adapted to close the gate upon the occurrence of a subsequent given counting operation of the cycle counting means, range-varying means capable of operation to preset the cycle counting means so that any one of a series of different given numbers will be counted thereby between said given counting operations, means for indicating the count made by the pulse counting means during the period that the gate is open, said range-varying means being adapted to be operated so that the count made by the pulse counting means is always between two predetermined limits whatever the frequency of the precession cycles, and means for indicating the setting of the range-varying means being employed to provide in conjunction with the indication of the count made by the pulse counting means, a measure of the intensity of the magnetic field being measured.

References Cited in the file of this patent

UNITED STATES PATENTS 2,856,579     Packard _____ Oct. 14, 1958

OTHER REFERENCES

Heppner et al.: Journal of Geophysical Research, vol. 63, No. 2, June 1958, pp. 277 to 288.

Waters et al.: Journal of Scientific Instruments, vol. 35, No. 3, March 1958, pp. 88 to 93.

Gimlett et al.: Engineering and Mining Journal, vol. 158, No. 5, May 1957, pp. 88 to 90.

Bradshaw: Electrical Engineering, vol. 31, No. 372, February 1959, pp. 96 to 97.